US011021249B2

(12) United States Patent
Raz

(10) Patent No.: US 11,021,249 B2
(45) Date of Patent: Jun. 1, 2021

(54) DRONE-BASED, ATTACKER NEUTRALIZATION

(71) Applicant: Itai Raz, Har-Adar (IL)

(72) Inventor: Itai Raz, Har-Adar (IL)

( * ) Notice: Subject to any disclaimer, the term of this patent is extended or adjusted under 35 U.S.C. 154(b) by 0 days.

(21) Appl. No.: 16/963,316

(22) PCT Filed: Jan. 22, 2020

(86) PCT No.: PCT/IL2020/050083
§ 371 (c)(1),
(2) Date: Jul. 20, 2020

(87) PCT Pub. No.: WO2020/152677
PCT Pub. Date: Jul. 30, 2020

(65) Prior Publication Data
US 2020/0407058 A1    Dec. 31, 2020

Related U.S. Application Data

(60) Provisional application No. 62/795,204, filed on Jan. 22, 2019.

(51) Int. Cl.
*B64C 39/02* (2006.01)
*G01C 21/00* (2006.01)
(Continued)

(52) U.S. Cl.
CPC .............. *B64C 39/024* (2013.01); *B64D 1/02* (2013.01); *B64D 47/00* (2013.01); *B64D 47/08* (2013.01);
(Continued)

(58) Field of Classification Search
CPC .. B64C 39/024; G01C 21/3885; B64D 47/00; B64D 47/08; E05B 47/00; H04N 21/2187
(Continued)

(56) References Cited

U.S. PATENT DOCUMENTS 7,855,935 B1 * 12/2010 Lauder ..................... G01S 3/80
367/129
2004/0100868 A1    5/2004 Patterson et al.
(Continued)

FOREIGN PATENT DOCUMENTS

DE        19801288 A1    7/1999
WO    2011127518 A1    10/2011

OTHER PUBLICATIONS

Extended European Search Report (EESR) received in EP Application No. 19206331.1 dated Jul. 6, 2020.
(Continued)

*Primary Examiner* — Peter D Nolan
*Assistant Examiner* — Luke Huynh
(74) *Attorney, Agent, or Firm* — The Roy Gross Law Firm, LLC; Roy Gross

(57) ABSTRACT

Methods and systems are provided for responding to an attacker including a shooter who opens fire at a site where people are gathered, including identifying, neutralizing, and restraining the attacker. A system may include a central control unit configured to receive signals indicative of gun fire, to responsively determine an origin of the gun fire, to identify features of a shooter associated with the gun fire and to release a UAV from a shielded UAV housing to engage the shooter. The UAV may be configured to fly towards the shooter, according to the origin of the gun fire and the identifying features of the shooter, and to neutralize the shooter by operating a UAV incapacitating mechanism.

34 Claims, 2 Drawing Sheets

(51) Int. Cl.
    *B64D 1/02*          (2006.01)
    *B64D 47/00*        (2006.01)
    *B64D 47/08*        (2006.01)
    *E05B 47/00*        (2006.01)
    *H04N 21/2187*    (2011.01)
    *F41H 13/00*        (2006.01)

(52) U.S. Cl.
    CPC .......... *E05B 47/00* (2013.01); *G01C 21/3885* (2020.08); *H04N 21/2187* (2013.01); *B64C 2201/12* (2013.01); *B64C 2201/141* (2013.01); *F41H 13/0025* (2013.01)

(58) Field of Classification Search
    USPC ............................................................ 701/3
    See application file for complete search history.

(56) References Cited

U.S. PATENT DOCUMENTS

| | | |
|---|---|---|
| 2007/0023582 A1 | 2/2007 | Steele et al. |
| 2014/0150631 A1 | 6/2014 | Nelson et al. |
| 2014/0251123 A1 | 9/2014 | Venema |
| 2016/0232774 A1* | 8/2016 | Noland .............. G08B 21/0438 |
| 2018/0233009 A1* | 8/2018 | Spector .................... G05D 1/12 |

OTHER PUBLICATIONS

International Search Report of PCT/IL2020/050083 Completed May 19, 2020; dated Jun. 8, 2020, 3 Pages.
Written Opinion of of PCT/IL2020/050083 Completed May 19, 2020; dated Jun. 8, 2020, 8 Pages.

\* cited by examiner

DRONE-BASED, ATTACKER NEUTRALIZATION

CROSS REFERENCE TO RELATED APPLICATIONS

This application is a National Phase of PCT Patent Application No. PCT/IL2020/050083 having International filing date of Jan. 22, 2020, which claims the benefit of priority of U.S. Provisional Application No. 62/795,204 filed Jan. 22, 2019 entitled "Drone-based, attacker neutralization." The contents of the above applications are all incorporated by reference as if fully set forth herein in their entirety.

FIELD OF THE INVENTION

The invention generally relates to methods of defense against physical attacks, in particular defense against shooting attacks by unmanned aerial vehicles.

BACKGROUND

Mass shootings are a horrifying but common problem of modern society. Over the past few years, shootings have occurred around the world, in schools, restaurants, hotels, airports, and other locations. In many occasions, the response time of law enforcement personnel to shooting attacks has not been timely enough in order to stop the shooters early and save lives.

SUMMARY

Embodiments of the present invention provide apparatus, methods and systems for responding to an attacker, or potential attacker, at a site (public or private) where people are gathered, including identifying, neutralizing, and restraining the attacker. In some embodiments, the attacker is a shooter, or a potential shooter possessing a weapon. Embodiments may include arming and releasing an unmanned aerial vehicle (UAV), commonly referred to as a drone, to facilitate neutralizing and restraining the attacker.

In some embodiments of the present invention, a system is provided for responding to a shooter, including an unmanned aerial vehicle (UAV), a shielded UAV housing, and a central control unit (CCU). The CCU includes a CCU processor and associated CCU memory storage. The CCU memory storage stores CCU instructions that when executed by the CCU implement steps of receiving audio signals indicative of gun fire and responsively determining an origin of the gun fire; receiving an image including the origin of the gun fire and responsively acquiring identifying features of a shooter associated with the gun fire; and reacting to the gun fire by releasing an unmanned aerial vehicle (UAV) to engage the shooter. The UAV includes a UAV microphone, a UAV camera, a UAV incapacitating mechanism, a UAV processor and associated memory storage, the memory storage comprising UAV instructions that when executed by the UAV processor implement steps including guiding the flight of the UAV towards the shooter, according to the origin of the gun fire and the identifying features of the shooter, and neutralizing the shooter by operating the UAV incapacitating mechanism.

In some embodiments, the UAV may additionally include restraints and neutralizing the shooter may additionally include releasing the restraints in the vicinity of the neutralized shooter after operating the UAV incapacitating mechanism. The UAV may additionally include a restraint compartment to hold the restraints during flight until releasing the restraints. The system may additionally include a speaker and wherein releasing the restraints may additionally include issuing instructions from the speaker to passersby to apply the restraints to the shooter after releasing the restraints.

The system may additionally include one or more observation microphones, configured to receive the audio signals indicative of gun fire and to transmit the audio signals to the CCU, as well as one or more observation cameras, configured to transmit the image including the origin of the gun fire to the CCU including the origin of the gun fire.

The system may additionally include a speaker for instructing the shooter to comply with instructions. Guiding the flight of the UAV towards the shooter may include playing a recording through the UAV speaker instructing the shooter to comply with instructions.

Guiding the UAV towards the shooter may include receiving from the CCU the shooter identifying features and correlating the shooter identifying features to identifying features in one or more images acquired by the UAV camera.

The UAV may be housed and subsequently released from the shielded housing. The UAV may be released after the CCU determines that the shielded housing is not under direct fire, which may be determined by several means, such as determining from the audio signals a direction of the gun fire, or detecting gun fire hitting the shielded housing. The UAV may be released responsively to receiving the audio signals indicative of gun fire. The system may also include a weapons detector, and wherein releasing the UAV comprises releasing the UAV responsively to receiving signals from the weapons detector. The UAV incapacitating mechanism may be a stun mechanism. The system may additionally include a flashing beam mechanism or aerosol mechanism for disorienting the shooter, or a speaker configured to play a loud, stunning sound disorienting the shooter.

Guiding the UAV towards the shooter may include guiding the UAV to within an operating range of the UAV incapacitating mechanism and/or opening a vent to permit the UAV to enter an enclosed area with the shooter. Guiding the UAV towards the shooter may include navigating the UAV towards the shooter according to a predefined map and may also include automatically locking a door of an enclosed area in which the shooter is located.

Reacting to the gun fire may also include: issuing an alert to one or more first responders, which may include an indication of the origin of the gun fire and/or a live video feed of the shooter; issuing an alert to a human operator and subsequently providing video of the shooter to the human operator; receiving one or more instructions for operating the UAV from the human operator; turning on emergency signage directing passersby to safety; automatically opening a door of an enclosed area in order to evacuate passersby; playing an audio message directing passersby to safety.

There is further provided by embodiments of the present invention a system for responding to a potential shooter in a secure area, which may include an unmanned aerial vehicle (UAV), a shielded UAV housing, and a central control unit (CCU) may execute instructions to implement steps including: receiving signals indicative of a weapon in the possession of a target individual, receiving an image including the target individual; responsively acquiring identifying features of the target individual and releasing the UAV from the shielded UAV housing to engage the target individual. The UAV may include a UAV incapacitating mechanism and may execute instructions to implement steps including guiding the flight of the UAV towards the target individual and neutralizing the target individual by operating the UAV incapacitating mechanism. The steps implemented by the CCU processor may also include identifying features of the target individual to determine if the target individual is authorized, and responsively not releasing the UAV. Identifying features of the target individual may include determining that the target individual is not authorized, and responsively taking one or more actions of alerting guards, closing doors ahead of the target individual, and issuing a verbal warning for the person to lay on the ground and to not touch his weapon. Signals indicative of a weapon may indicate the presence of a concealed weapon.

There is further provided by embodiments of the present invention a method of restraining a shooter in a secure area, including: receiving audio signals indicative of gun fire; responsively determining an origin of the gun fire; receiving an image including the origin of the gun fire and responsively acquiring identifying features of a shooter associated with the gun fire; releasing an unmanned aerial vehicle (UAV) to engage the shooter; guiding the flight of the UAV towards the shooter, according to the origin of the gun fire and the identifying features of the shooter; and neutralizing the shooter by operating a UAV incapacitating mechanism.

BRIEF DESCRIPTION OF DRAWINGS

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice. In the accompanying drawings.

DETAILED DESCRIPTION

Figure 1:
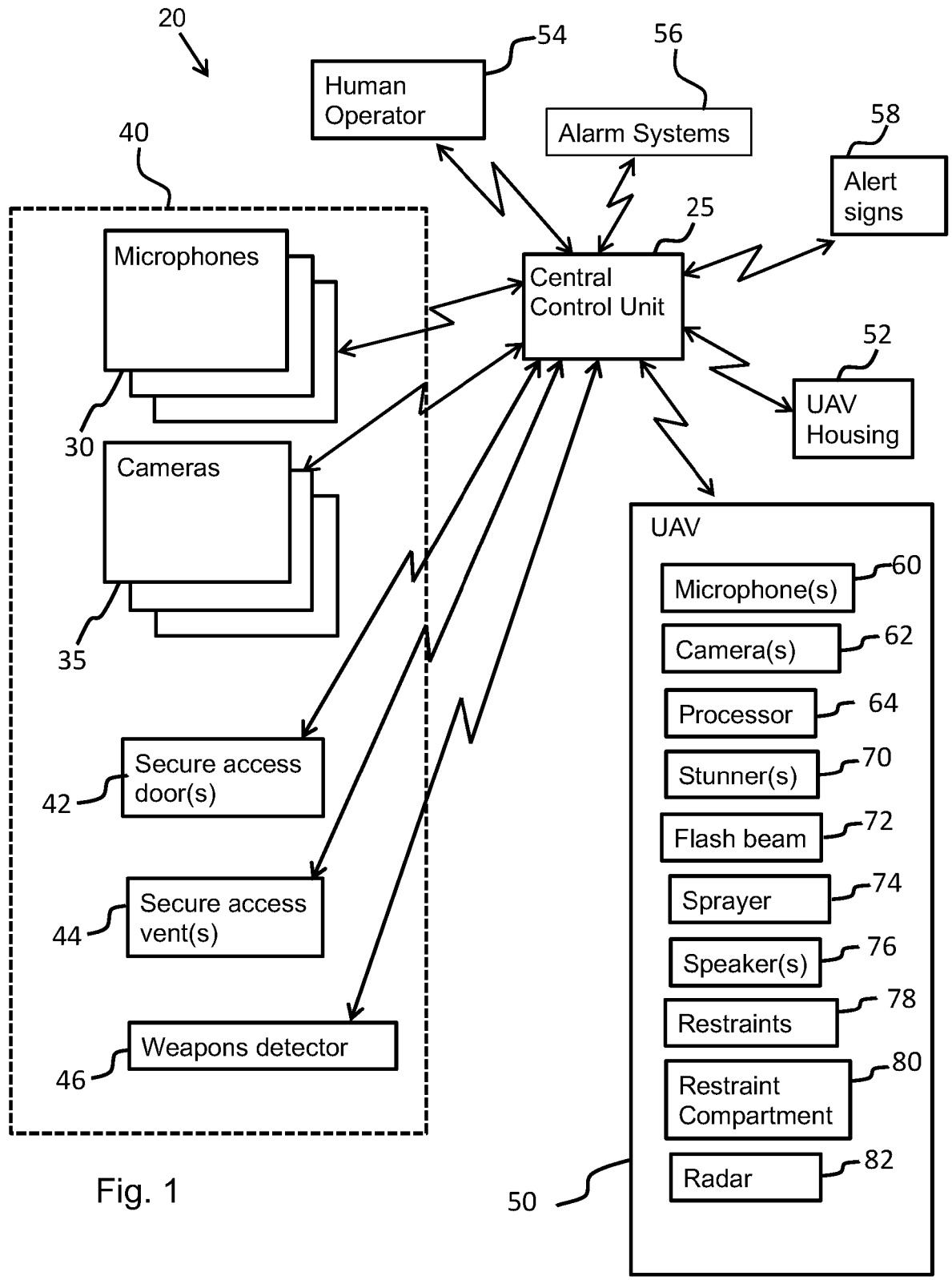
FIG. 1 is a schematic block diagram of a system for responding to a shooter, according to some embodiments of the present invention.

It is to be understood that the invention and its application are not limited to the methods and systems described below or to the arrangement of the components set forth or illustrated in the drawings, but are applicable to other embodiments that may be practiced or carried out in various ways.

FIG. 1 is a schematic block diagram of a system 20 for responding to a shooter in any location where people may gather, according to some embodiments of the present invention. The location may be any private or public site, such as a private residence, or a public location, such as a restaurant, meeting hall, auditorium, classroom or lounge; or an outdoor location, such as a courtyard, park, or outdoor café. In embodiments of the present invention, a central control unit ("CCU") 25 is installed to communicate with, and to control, other elements of the system. Hereinbelow, any location secured by system 20 is referred to as a secure area. The CCU 25 includes one or more CCU processors and storage memory that includes instructions to processes input from the other elements of the system and to generate signals to control those elements. Communications between elements of the system may be wired or wireless, and may be encrypted to prevent hacking by sophisticated attackers.

Installed in the immediate vicinity of the secure area are one or more observation microphones 30 and one or more observation cameras 35, which communicate respective audio and video signals to the CCU 25 (i.e., to the one or more processors of the CCU). Both the observation microphones and the observation cameras are typically located positions with a line-of-sight orientation towards the secure area. That is, each of the one or more microphones 30 typically has an unblocked line-of-site orientation to at least a part of the secure area, such that it can receive a direct sound wave from a gunshot before receiving echo waves, and such that all of the microphones together provide complete, direct coverage of the secure area. Similarly, each of the one or more cameras 35 typically has an unblocked view of all least a part of the secure area, such that all of the cameras together provide complete coverage of the secure area. The one or more observation microphones 30 and the one or more observation cameras 35 may be affixed to permanent fixtures, such as polls or walls in the secure area. Additionally or alternatively, one or more of the observation microphones 30 and/or cameras 35 may be installed on one or more observation drones that patrol the secure area while in flight.

In some embodiments, operating parameters of the observation microphones 30 and the observation cameras 35, such as focus and orientation, may be controlled by the CCU 25. Audio and video signals from the respective microphones and cameras may be transmitted continuously to the CCU 25, which processes the signals as described further hereinbelow. Alternatively, the observation microphones 30 and the observation cameras 35 may be programmed to send signals to the CCU 25 in response to identifying respective audio and video signals that meet predefined criteria. For example, the observation microphones 30 may be configured to transmit audio signals when the signals surpass a certain volume threshold or when a sound is identified as a gunshot. Similarly, the observation cameras 35 may be configured with motion sensors to send signals only when there is visible motion surpassing a certain threshold.

In some embodiments, the observation microphones 30 and observation cameras 35 may be located in an enclosed area 40, such as a classroom or pub. Entrance to the enclosed area may be made through of at least one secure door 42, as described further hereinbelow. Hereinbelow, the observation microphones and cameras are differentiated from microphones and cameras installed on an unmanned aerial vehicle configured to respond to a shooting attack, as described further hereinbelow.

Walls, doors, and/or windows of the secure area may also be configured with secure vents 44 that may be configured to open upon receiving a signal from an unmanned aerial vehicle (UAV) 50 or from the CCU 25, in order to allow the UAV to pass into a closed location, such as the enclosed area 40 in which or from which a shooter is firing a firearm. The system may also include weapons detectors, such as metal detectors and radar (such as Hexware™ technology), which may also detect concealed weapons, such as firearms or explosives.

System 20 typically includes at least one UAV 50, also referred to herein as a drone.

The UAV 50 is typically housed, until released, in a UAV housing 52, which may be a bullet-proof compartment to prevent destruction by gun fire. Upon determining, based on signals received by the observation microphones and/or cameras and/or the weapons detectors, that someone has a firearm or is firing a firearm, the CCU 25 may activate the UAV 50 to respond to the threat, causing the UAV 50 to begin flight, while simultaneously opening a door of the UAV housing 52, thereby releasing the UAV 50 to respond to the threat. The UAV housing may be configured with the door on the bottom of the housing, that is, as the floor of the housing, allowing the UAV to drop out of the housing, thereby leaving the housing with the acceleration of gravity. In system that include more than one UAV, multiple UAVs may be housed in a single housing. System 20 may also include multiple housings, each one containing one or more UAVs.

Upon determining presence of gun fire, according to the gun fire audio sounds, and/or upon determining, based on imaging or weapons detection, a shooter to target (the targeted shooter also being referred to herein as the "target"), the CCU 25 may also send a notice to one or more human operators 54 who may be involved in subsequent manual or semi-automated control of the UAV 50. The human operators may be situated at a remote location. The CCU may send a live video feed to computer stations or to mobile devices of the human operators, enabling the human operators to see the secure area from the perspective of any of the UAV or observation cameras, while also hearing the audio from any of the UAV or observation microphones. Alternatively or additionally, upon receiving signals from weapons detection equipment identifying someone carrying a firearm (concealed or not), i.e., upon identifying a potential shooter, the CCU 25 may send a notice and/or video feed to human operators. The CCU may be configured to send an alert without operating the UAV 50, providing the human operators with control over release of the UAV, that is, activating the UAV (and open the UAV housing) remotely. In other words, identification of a potential shooter may put human operators on a state of alert. The CCU may also include a machine intelligence recognition engine trained to visually recognize authorized personnel who may be carrying firearms and do not pose a threat. The machine intelligence recognition engine may utilize facial recognition and/or other identifying characteristics of personnel, such as identifying tags or uniforms. When an authorized person is identified by the CCU, an alert regarding a firearm or weapon is typically not issued, or, if the alert was issued, it may be subsequently cancelled automatically by the CCU.

The CCU may also send out alert notices to others, in addition to the human operators, for example sending signals to alarm systems 56 to notify security staff (e.g., "first responders") to come to the site. Alerts may also notify the general public to flee. The notification to security staff may include the location of the origin of the gun fire. The CCU may also lock or open the secure access doors 42 (for example, locking a door to trap a shooter in a room, or opening a door for bystanders to flee or for first responders to enter the area). Additionally or alternatively, the CCU may turn on emergency notices on electric signage 58, warning passersby of the threat and/or directing them to safety.

The UAV 50 is typically a multi-rotor platform with secure wireless communications capabilities, a maximum flight speed of at least 50 km/h, a diameter of less than 1 meter, and a lift capacity of at least 3 kilograms. UAVs with such capabilities are currently commercially available; examples include the THOR™ vertical takeoff and landing (VTOL) Mini Unmanned Aircraft System (UAS) from Elbit Systems.

The UAV 50 is typically equipped with a UAV microphone 60, and a UAV camera 62. The UAV 50 is typically released after receiving location and shooter identifying data from the CCU 25, based on signals received from the observation microphones and cameras. After release, the UAV 50 may continue to receive, from the CCU 25, updated location and shooter identifying data (e.g., identifying features, as described below). Alternatively or additionally, a UAV processor 64, with which the UAV 50 is typically equipped, may process audio signals from the UAV microphone 60 as well video signals from the UAV camera 62 to update location and shooter identifying data and to control the flight of the UAV 50 towards the target. The UAV processor 64 may also control standard processing, flight, and communications functions of the UAV 50.

In embodiments of the present invention, the UAV 50 is also equipped with one or more mechanisms for stunning or otherwise incapacitating a person, such as a stunner 70. Stunner 70 may be a taser device, such as a TASER™ stun product made by Axon Enterprise, which typically fires a pair of wired, barbed electrodes at a target and then proceeds to deliver rapid, high voltage charges to the target. The typical range of such a stun device is 1 to 10 meters.

The stunner affects the sensory and motor functions of the nervous system of the shooter and inhibits muscular control, typically for at least 30 seconds, thereby incapacitating the shooter. Stunner 70 may include multiple stun cartridges (for example, two to four) to stun multiple targets, that is, multiple shooters at the same location. The stunner may also include a light source that generates a beam to indicate where on the body of the target the stunner electrodes will hit.

Alternatively or additionally, the UAV 50 may be equipped with other incapacitating mechanisms, that is, other means of causing a shooter to lose muscular control. For example, the UAV 50 may also be equipped with means of disorienting a shooter, such as a high-power, visible flash beam generator 72, or an aerosol sprayer 74, for ejecting incapacitating sprays, such as pepper spray.

The UAV 50 may also include one or more speakers 76 (i.e., a loudspeaker), configured to play a loud, stunning sound for disorienting the shooter. Speakers 76 may also be configured to make audio announcements to the target and/or to passersby. For example, before stunning a target, the UAV 50 may play a preset recording that warns the target that he will be "tased" unless he complies with instructions, for example, to put down all firearms and to lie down. Alternatively or additionally, the UAV 50 may broadcast audio instructions from a human operator. Audio announcements to the target may also be made as loud, disorienting commands (e.g., "LAY DOWN THE WEAPON! LIE DOWN!"). Also alternatively or additionally to being affixed to the UAV, the speaker 72 may positioned in and/or around the secure area, and may be a distributed speaker system of multiple speakers, such that audio announcements and alerts made through the speaker system can be heard in the secure area. Announcements may be made to passersby, directing them to safety, or assisting in restraining the shooter, as described further hereinbelow.

The UAV processor 64 may be configured to visually identify whether a shooter has complied and laid down his weapon; alternatively, video may be provided to the human operator 54 who may make a determination of compliance. The UAV processor 64 may be configured to automatically release a taser shot or other mechanism to incapacitate the target, typically after a determination of non-compliance. Additionally or alternatively, the UAV processor 64 may be configured to receive a signal from the human operator 54 to release the incapacitating mechanism to incapacitate the target.

The UAV 50 may also be equipped with restraints 78. Hereinbelow, the term "restraints" refers to any means for restraining limbs of a human being, including handcuffs, plastic and metal wrist and ankle restraints, as well as appropriate types of tape and zip ties. The restraints are housed in a restraint compartment 80 of the UAV. The restraint compartment typically has a door or latch which is configured to release the restraints upon receiving a signal from the UAV processor 64, typically provided after determining that the target has been incapacitated.

The UAV processor 64 may also be configured with map data of a site, stored in storage memory of the UAV processor 64. For example, a UAV 50 may provide security for a school campus with multiple classrooms. A shooting incident in one classroom may trigger release of the UAV 50 from a different location on the school campus. Based on the map data, the UAV may navigate to the origin of the gun fire. The map data may also be learned by a machine learning capability of the UAV processor 64, based on flying the UAV around the campus or facility during training sessions. The UAV processor may also include location sensors, such as a GPS sensor to receive signals from indoor GPS signal generators, or by other methods of determining location known in the art. The UAV may also be equipped with a radar sensor 82 or other distance sensor for identifying obstacles in its path and for enabling the UAV to navigate to avoid such obstacles.

Figure 2:
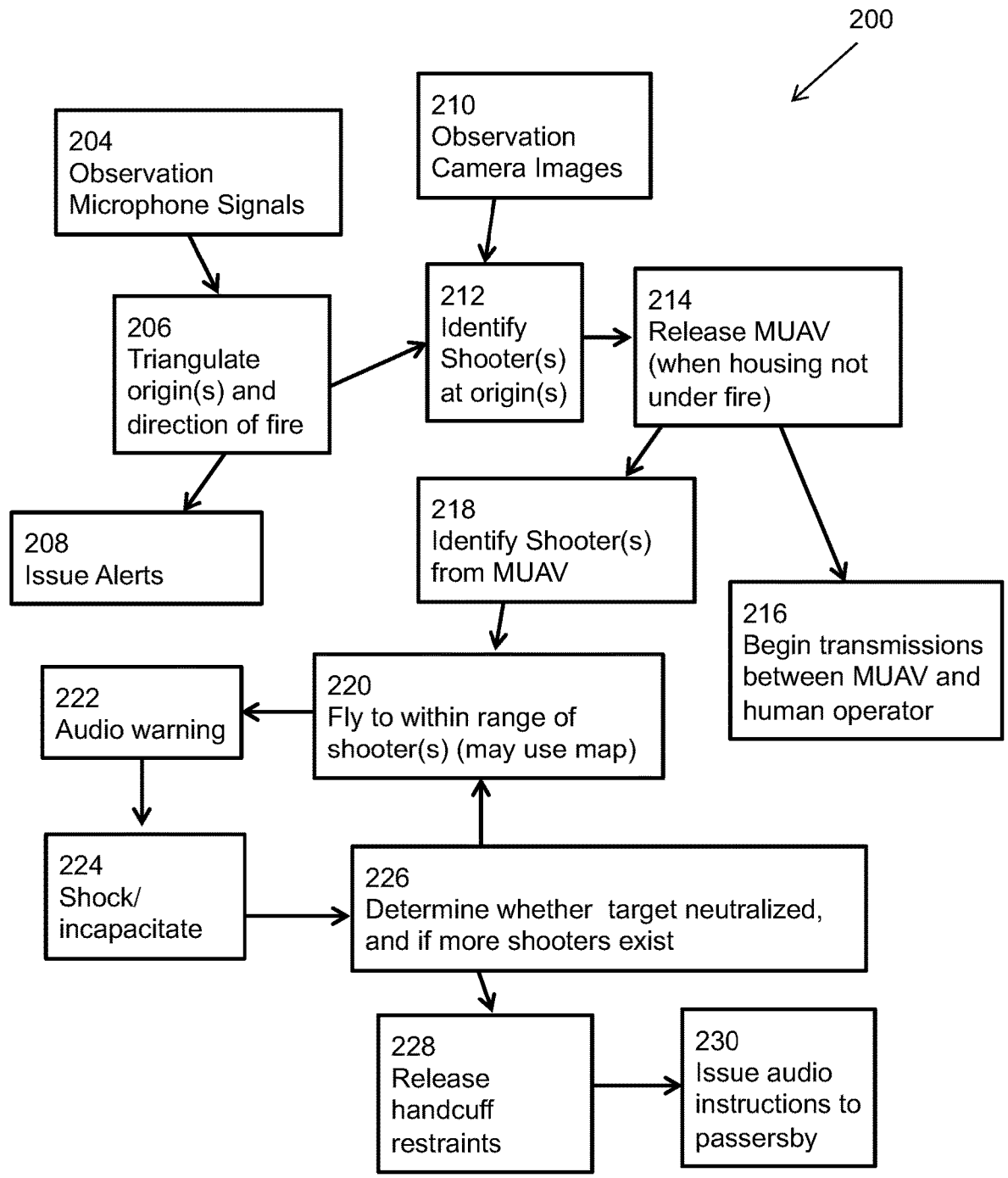
FIG. 2 is a flow diagram of a method for responding to a shooter, according to some embodiments of the present invention.

FIG. 2 is a flow diagram of a method 200 for responding to a shooter, according to some embodiments of the present invention. Most steps of method 200 may be automated by implementation of the steps by the elements of the system 20 described above.

At a step 204, gun fire is sensed by the one or more observation microphones 30. As described above, the observation microphone(s) may process the audio signals to identify the gun fire, or may transmit the audio to the CCU which processes the signals and identifies the gun fire. Signals received by multiple microphones may be employed to triangulate the sounds to identify an origin of the shooting (step 206), that is, the point from which the gun fire is emanating. In further embodiments, movement of a shooter, as well as a direction of munitions fire may also be identified by sound processing algorithms known in the art. In particular, the CCU may be configured to identify location and direction parameters of the shooting based on processing supersonic blasts that may be identified as gun fire. Additionally or alternatively, subsonic shots may be identified by similar sound processing algorithms.

Upon identifying gun fire, the CCU 25 will typically issue alerts at a step 208. The alerts may include notifications both to the alarm systems 56 and to the human operator 54, described above. At step 208, or subsequently, the CCU may also lock or open the secure access doors 42, that is, locking a door to trap a shooter in a room, or opening a door for bystanders to flee or for first responders to enter the secure area. The CCU may also turn on emergency notices on electric signage 58, warning passersby of the threat and directing them to safety.

After identifying a location of the shooter, the CCU 25 may receive video signals (including one or more images) from the observation cameras at a step 210, while at least one of the observation cameras is oriented to acquire an image including the point of origin of the gun fire. Processing of the video signals (step 210) provides identifying visual features of the shooter, or shooters (step 212), at the gun fire point of origin. Additional image processing algorithms may be employed to confirm the identity of the shooter as someone holding and/or firing a firearm.

The shooter identifying data, including identifying visual features of the shooter, enables the system to subsequently track the shooter according to that identifying data, even if the shooter moves and stops the shooting (which would prevent updating of the shooter location by audio analysis). Identifying visual features are features selected to recognize facial features and other body features of the shooter, as determining by object recognition algorithms known in the art.

The CCU 25 transmits the location and identifying data (e.g., image features) to the UAV 50, while continuing to track the shooter's movement, so as to provide updated information to the UAV 50. After transmitting initial data, the CCU 25 also releases the UAV 50 from the UAV housing 52, at a step 214.

The UAV housing 52 may be configured with a housing processor and microphone or pressure sensor, to recognize gun fire air pressure signals indicating when gun fire is directed towards the housing (or actually hitting the housing), and to delay releasing the UAV so that the UAV is not damaged by direct gun fire. Alternatively, the CCU may determine the direction of the gunfire, that is, the direction in which the bullets or other projectiles are being shot, by processing the gun fire audio signals (for example, by triangulation), and may release the UAV only if the direction of gun fire does not indicate that the UAV housing is in the line of fire.

Upon being released, the UAV 50 may continue communicating with the human operator 54, providing a direct video feed of the scene while receiving instructions from the human operator (step 216).

The UAV processor 64 may be configured to operate the UAV automatically, flying the UAV in the direction of the gun fire origin in order to engage the shooter (i.e., to confront the shooter, play a warning message, stun and/or disorient the shooter, etc.). The UAV processor may also receive video from the UAV camera 62 to visually identify and to continue tracking the target(s) as the target moves (step 218). An image processing algorithm of the UAV processor may be configured to correlate the shooter identifying features received from the CCU 25 to identifying features in one or more images in the video received from the UAV camera.

In a situation involving multiple shooters, the UAV processor 64 may determine an order of engaging the shooters, based on pre-configuration of a selection algorithm. The selection algorithm may consider parameters such as distance to shooter, gunfire frequency, gun and/or projectile types, as well as parameters of the secure area, such as typical distribution of passersby. The selection algorithm may be developed by a machine learning process to optimize selection to minimize victim injury.

The UAV may also be operated manually, allowing a human operator to navigate the flight. Semi-autonomous flight may also be performed, whereby a direction of flight is specified by a human operator, but navigation, as well as avoidance of hazards, may be controlled by the UAV processor 64. When flown automatically, the UAV 50, at a step 220, flies towards the target until within a range of taser effective operation (or within the range of alternative means of incapacitating the target). The UAV may also be configured to hover within an effective taser range of the target.

When the UAV is in range of the target, an audio announcement (pre-recorded or issued by a human operator) may be issued from the UAV speaker to the target, demanding compliance and laying down of weapons (step 222). A determination that the target has complied may be made automatically by machine vision image processing of the scene or by the human operator.

The stunner 70 or other incapacitating mechanism may be triggered by the UAV processor 64, typically after determining that the target has not complied with instructions (step 224). If there are multiple shooters within range, the UAV may fire multiple incapacitating mechanisms simultaneously, such as multiple tasers.

A determination may then be made that the target has been incapacitated. The determination may be made automatically by machine vision image processing of the scene (step 226). The processing may be performed either by the UAV processor 64, or may be performed by an external processor, such as the CCU (i.e., the processor of the CCU). Alternatively, the human operator may determine from a video feed and/or individual images received from the UAV and/or observation cameras that the target has been incapacitate.

At a step 228, the UAV processor 64 may operate the restraint compartment 80 to release the restraints 78 in the vicinity of the target. Release of the restraints is typically performed after determining that the target has been incapacitated. If the determination of incapacitation is made by the external processor or by the human operator, the UAV processor receives from these external elements a signal indicative of the determination and thereupon releases the restraints.

Subsequently, at a step 230, the UAV processor may play an audio message over the UAV speaker, the audio message being pre-recorded or broadcast by the human operator. The audio message notifies passersby that the target is incapacitated and disarmed momentarily and that they may apply the restraints to the target in order to prevent further attack after the neurological effects of the stunner have subsided. By applying restraints, non-professionals in the vicinity of the shooter may ensure that the shooter remains neutralized (i.e., incapable of action) even if the arrival of first responder security personnel is delayed. If restraints are not applied within a short period of time, the shooter's muscular control may be restored, enabling the shooter to renew his attack. Audio messages may also be directed towards passersby, directing them to safety (e.g., providing directions for escaping the scene).

If the target has not been neutralized, or there are other shooters, the process continues, as the UAV flies towards the target (step 220).

It is to be understood that all elements of the system 20 may be provided in multiples, that is, the system 20 may include multiple CCUs 25, each controlling one or more UAVs 50, each UAV 50 having one or more of each of the microphones, cameras, processors, stunners, speakers, flash beams, restraints, restraint compartments, and radar units, as well as additional accessories for engaging targets, such as aerosol devices.

Computational aspects of the process 200 and of the system 20 may be implemented in digital electronic circuitry, or in computer hardware, embedded firmware, software, or in combinations thereof. All or part of the process may be implemented as a computer program product, tangibly embodied in an information carrier, such as a machine-readable storage device or in a propagated signal, for execution by, or to control the operation of, data processing apparatus, such as a programmable processor, computer, or deployed to be executed on multiple computers at one site, or distributed across multiple sites, or in a cloud configuration. Memory storage may also include multiple distributed memory units, including one or more types of storage media. A computing system configured to implement the system may have one or more processors and one or more network interface modules. Processors may be configured as a multi-processing or distributed processing system. Network interface modules may control the sending and receiving of data packets over networks.

It is to be understood that the scope of the present invention includes variations and modifications thereof which would occur to persons skilled in the art upon reading the foregoing description and which are not disclosed in the prior art.

The invention claimed is:

1. A system for responding to a shooter, comprising:
an unmanned aerial vehicle (UAV);
a shielded UAV housing;
a central control unit (CCU) having a CCU processor and associated non-transitory CCU memory storage, the CCU memory storage comprising CCU instructions that when executed by the CCU processor implement steps comprising: receiving signals indicative of gun fire and responsively determining an origin of the gun fire; receiving an image including the origin of the gun fire and responsively acquiring identifying features of a shooter associated with the gun fire; and reacting to the gun fire by releasing the UAV from the shielded UAV housing to engage the shooter, after the CCU determines that the shielded housing is not under direct fire;
wherein the UAV comprises a UAV incapacitating mechanism, a UAV processor and associated memory storage, the memory storage comprising UAV instructions that when executed by the UAV processor implement steps comprising guiding the flight of the UAV towards the shooter, according to the origin of the gun fire and the identifying features of the shooter, and neutralizing the shooter by operating the UAV incapacitating mechanism.

2. The system of claim 1, wherein the UAV further comprises restraints and wherein neutralizing the shooter further comprises releasing the restraints in the vicinity of the neutralized shooter after operating the UAV incapacitating mechanism.

3. The system of claim 2, wherein the UAV further comprises a restraint compartment to hold the restraints during flight until releasing the restraints.

4. The system of claim 2, wherein the system further comprises a speaker and wherein releasing the restraints further comprises issuing instructions from the speaker to passersby to apply the restraints to the shooter after releasing the restraints.

5. The system of claim 2, wherein releasing the restraints comprises releasing the restraints after determining that the shooter is incapacitated.

6. The system of claim 1, wherein the signals indicative of gun fire are audio signals, and wherein the system further comprises one or more observation microphones, configured to receive the audio signals and to transmit the audio signals to the CCU.

7. The system of claim 1, wherein the system further comprises one or more observation cameras, configured to transmit the image including the origin of the gun fire to the CCU including the origin of the gun fire.

8. The system of claim 1, wherein the system further comprises a speaker for instructing the shooter to comply with instructions.

9. The system of claim 1, wherein the UAV further comprises a UAV speaker, and wherein guiding the flight of the UAV towards the shooter comprises playing a recording through the UAV speaker instructing the shooter to comply with instructions.

10. The system of claim 1, wherein the UAV further comprises a UAV camera, and guiding the UAV towards the shooter comprises receiving from the CCU the shooter identifying features and correlating the shooter identifying features to identifying features in one or more images acquired by the UAV camera.

11. The system of claim 1, wherein determining that the shielded housing is not under direct fire comprises determining from audio signals a direction of the gun fire.

12. The system of claim 1, wherein shielded housing further comprises a pressure sensor detecting gun fire hitting the housing.

13. The system of claim 1, wherein the system further comprises a weapons detector, and wherein releasing the UAV comprises releasing the UAV responsively to receiving signals from the weapons detector.

14. The system of claim 1, wherein the UAV incapacitating mechanism is a stun mechanism.

15. The system of claim 1, wherein the UAV further comprises a speaker configured to play a loud, stunning sound for disorienting the shooter.

16. The system of claim 1, wherein the UAV further comprises a flashing beam mechanism for disorienting the shooter.

17. The system of claim 1, wherein the UAV further comprises an aerosol mechanism for disorienting the shooter.

18. The system of claim 1, wherein guiding the UAV towards the shooter comprises guiding the UAV to within an operating range of the UAV incapacitating mechanism.

19. The system of claim 1, wherein guiding the UAV towards the shooter comprises opening a vent to permit the UAV to enter an enclosed area with the shooter.

20. The system of claim 1, wherein guiding the UAV towards the shooter comprises navigating the UAV towards the shooter according to a predefined map.

21. The system of claim 1, wherein reacting to the gun fire further comprises automatically locking a door of an enclosed area in which the shooter is located.

22. The system of claim 1, wherein reacting to the gun fire further comprises automatically opening a door of an enclosed area in order to evacuate passersby.

23. The system of claim 1, wherein reacting to the gun fire further comprises playing an audio message directing passersby to safety.

24. The system of claim 1, wherein reacting to the gun fire further comprises turning on emergency signage directing passersby to safety.

25. The system of claim 1, wherein reacting to the gun fire further comprises issuing an alert to one or more first responders.

26. The system of claim 25, wherein the alert to the one or more first responders includes a location indicating the origin of the gun fire.

27. The system of claim 25, wherein the alert to a human operator includes a live video feed of the shooter.

28. The system of claim 1, wherein reacting to the gun fire further comprises receiving one or more instructions for operating the UAV from a human operator.

29. A system for responding to a shooter, comprising:
an unmanned aerial vehicle (UAV);
a shielded UAV housing;
a central control unit (CCU) having a CCU processor and associated non-transitory CCU memory storage, the CCU memory storage comprising CCU instructions that when executed by the CCU processor implement steps comprising: receiving signals indicative of gun fire and responsively determining an origin of the gun fire; receiving an image including the origin of the gun fire and responsively acquiring identifying features of a shooter associated with the gun fire; and reacting to the gun fire by releasing the UAV from the shielded UAV housing to engage the shooter;
wherein the UAV comprises a UAV incapacitating mechanism, a UAV processor and associated memory storage, the memory storage comprising UAV instructions that when executed by the UAV processor implement steps comprising guiding the flight of the UAV towards the shooter, according to the origin of the gun fire and the identifying features of the shooter, and neutralizing the shooter by operating the UAV incapacitating mechanism, and wherein the UAV further comprises a restraint compartment to hold the restraints during flight until releasing the restraints.

30. The system of claim 29, wherein the UAV incapacitating mechanism is a stun mechanism.

31. The system of claim 29, wherein the UAV further comprises a flashing beam mechanism for disorienting the shooter.

32. A system for responding to a shooter, comprising:
an unmanned aerial vehicle (UAV);
a shielded UAV housing;
a central control unit (CCU) having a CCU processor and associated non-transitory CCU memory storage, the CCU memory storage comprising CCU instructions that when executed by the CCU processor implement steps comprising: receiving signals indicative of gun fire and responsively determining an origin of the gun fire; receiving an image including the origin of the gun fire and responsively acquiring identifying features of a shooter associated with the gun fire; and reacting to the gun fire by releasing the UAV from the shielded UAV housing to engage the shooter;
wherein the UAV comprises a UAV incapacitating mechanism, a UAV processor and associated memory storage, the memory storage comprising UAV instructions that when executed by the UAV processor implement steps comprising guiding the flight of the UAV towards the shooter including opening a vent to permit the UAV to enter an enclosed area with the shooter, according to the origin of the gun fire and the identifying features of the shooter, and neutralizing the shooter by operating the UAV incapacitating mechanism.

33. The system of claim 32, wherein the UAV incapacitating mechanism is a stun mechanism.

34. The system of claim 32, wherein the UAV further comprises a flashing beam.

* * * * *